(12) United States Patent
Pamidiparthi

(10) Patent No.: US 10,091,146 B2
(45) Date of Patent: *Oct. 2, 2018

(54) SYSTEM AND METHOD FOR MONITORING AND COPYING MULTIMEDIA MESSAGES TO STORAGE LOCATIONS IN COMPLIANCE WITH A POLICY

(71) Applicant: Commvault Systems, Inc., Tinton Falls, NJ (US)

(72) Inventor: Sandeep Naidu Pamidiparthi, District Nizamabad (IN)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/863,866

(22) Filed: Sep. 24, 2015

(65) Prior Publication Data

US 2016/0112355 A1 Apr. 21, 2016

Related U.S. Application Data

(63) Continuation of application No. 12/612,359, filed on Nov. 4, 2009, now Pat. No. 9,178,842.

(Continued)

(51) Int. Cl.
*G06F 15/16* (2006.01)
*G06F 15/173* (2006.01)
(Continued)

(52) U.S. Cl.
CPC ........ *H04L 51/063* (2013.01); *G06F 17/2264* (2013.01); *G06F 17/30076* (2013.01);
(Continued)

(58) Field of Classification Search
CPC ......... G06F 17/30076; G06F 17/30569; G06F 17/2264; G06Q 10/10; G06Q 10/107; H04L 51/14
(Continued)

(56) References Cited

U.S. PATENT DOCUMENTS 4,837,798 A * 6/1989 Cohen .................. G06Q 10/107
379/396
5,093,912 A 3/1992 Dong et al.
(Continued)

FOREIGN PATENT DOCUMENTS

EP 0259912 3/1988
EP 0405926 1/1991
(Continued)

OTHER PUBLICATIONS

Arneson, "Mass Storage Archiving in Network Environments" IEEE, 1998, pp. 45-50.

(Continued)

*Primary Examiner* — Daniel C Murray
(74) *Attorney, Agent, or Firm* — Knobbe, Martens, Olson & Bear, LLP

(57) ABSTRACT

The present inventions relate systems and methods for monitoring and managing electronic messages in one or more computer networks. More particularly, the systems and methods of the present invention provide a substantially global or unified approach to messaging management within one or more computer networks that allows network administrators or other authorized users to define and identify electronic messages of interest within the network and store selected messages such that they can be retrieved and examined in connection with an audit or other inquiry.

17 Claims, 2 Drawing Sheets

Related U.S. Application Data

(60) Provisional application No. 61/111,410, filed on Nov. 5, 2008.

(51) Int. Cl.
*G06F 17/00* (2006.01)
*H04L 12/58* (2006.01)
*G06Q 10/10* (2012.01)
*G06F 17/30* (2006.01)
*G06F 17/22* (2006.01)
*H04L 12/24* (2006.01)

(52) U.S. Cl.
CPC ....... *G06F 17/30569* (2013.01); *G06Q 10/10* (2013.01); *G06Q 10/107* (2013.01); *H04L 41/22* (2013.01); *H04L 51/14* (2013.01)

(58) Field of Classification Search
USPC .............................. 709/224; 715/239, 249
See application file for complete search history.

(56) References Cited

U.S. PATENT DOCUMENTS

| | | | |
|---|---|---|---|
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,800 A | 1/1994 | Fortier et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,347,653 A | 9/1994 | Flynn et al. | |
| 5,377,354 A * | 12/1994 | Scannell ................ H04L 51/22 706/45 | |
| 5,410,700 A | 4/1995 | Fecteau et al. | |
| 5,420,996 A | 5/1995 | Aoyagi | |
| 5,448,724 A | 9/1995 | Hayashi et al. | |
| 5,454,099 A | 9/1995 | Myers et al. | |
| 5,495,607 A * | 2/1996 | Pisello ............. G06F 17/30126 707/781 | |
| 5,559,991 A | 9/1996 | Kanfi | |
| 5,642,496 A | 6/1997 | Kanfi | |
| 5,652,876 A * | 7/1997 | Ashe .................. G06F 17/2205 703/26 | |
| 5,732,126 A * | 3/1998 | Fitzpatrick ........... H04L 51/066 379/88.17 | |
| 5,793,771 A * | 8/1998 | Darland ................ H04L 29/06 370/467 | |
| 5,802,314 A * | 9/1998 | Tullis .................... H04L 29/06 379/100.13 | |
| 5,813,008 A * | 9/1998 | Benson ............... G06Q 10/107 | |
| 5,813,009 A * | 9/1998 | Johnson ............ G06F 17/30017 707/695 | |
| 5,875,478 A * | 2/1999 | Blumenau ............ G06F 11/1458 711/162 | |
| 5,948,059 A * | 9/1999 | Woo ........................ H04L 12/58 709/206 | |
| 5,978,846 A * | 11/1999 | Kimishima ............. H04L 29/06 709/227 | |
| 5,991,806 A * | 11/1999 | McHann, Jr. ......... H04L 41/0213 709/224 | |
| 6,039,245 A * | 3/2000 | Symonds ............. G06Q 20/202 235/379 | |
| 6,067,516 A * | 5/2000 | Levay .................... H04M 3/42 379/900 | |
| 6,092,118 A * | 7/2000 | Tsang ........................ G06F 9/54 709/207 | |
| 6,167,402 A * | 12/2000 | Yeager ............... G06F 17/30955 | |
| 6,233,318 B1 * | 5/2001 | Picard ................ H04L 12/5835 379/88.12 | |
| 6,260,043 B1 * | 7/2001 | Puri ................ G06F 17/30076 | |
| 6,295,561 B1 * | 9/2001 | Nagy ...................... G06F 8/447 709/246 | |
| 6,302,326 B1 * | 10/2001 | Symonds ............ G06Q 20/202 235/379 | |
| 6,330,598 B1 * | 12/2001 | Beckwith ............. H04Q 3/0029 709/223 | |
| 6,350,066 B1 * | 2/2002 | Bobo, II ................ H04L 29/06 709/202 | |
| 6,356,801 B1 * | 3/2002 | Goodman ............. G06F 9/5027 700/214 | |
| 6,389,129 B1 * | 5/2002 | Cowan .................... H04L 29/06 379/221.03 | |
| 6,418,478 B1 | 7/2002 | Ignatius et al. | |
| 6,424,997 B1 * | 7/2002 | Buskirk, Jr. ............ G06F 17/27 709/201 | |
| 6,519,679 B2 * | 2/2003 | Devireddy ............ G06F 3/0605 711/114 | |
| 6,542,972 B2 | 4/2003 | Ignatius et al. | |
| 6,564,228 B1 * | 5/2003 | O'Connor ............. G06F 3/0604 | |
| 6,650,890 B1 * | 11/2003 | Irlam .................... G06Q 10/107 455/412.1 | |
| 6,654,788 B1 * | 11/2003 | Chance ................ G06Q 10/107 709/201 | |
| 6,658,436 B2 | 12/2003 | Oshinsky et al. | |
| 6,708,189 B1 * | 3/2004 | Fitzsimons ....... G06F 17/30569 | |
| 6,721,767 B2 | 4/2004 | De Meno et al. | |
| 6,738,378 B2 * | 5/2004 | Tuck, III ................ H04L 47/24 370/392 | |
| 6,745,194 B2 * | 6/2004 | Burrows ........... G06F 17/30622 | |
| 6,760,723 B2 | 7/2004 | Oshinsky et al. | |
| 6,880,005 B1 * | 4/2005 | Bell ...................... H04L 47/10 709/223 | |
| 6,880,016 B1 * | 4/2005 | Van Der Heijden ....................... G06Q 10/107 709/230 | |
| 6,912,378 B2 * | 6/2005 | Morewitz, II .......... G10L 25/78 455/130 | |
| 6,970,946 B2 * | 11/2005 | Ueoka ..................... G06F 17/22 704/2 | |
| 7,003,641 B2 | 2/2006 | Prahlad et al. | |
| 7,035,880 B1 | 4/2006 | Crescenti et al. | |
| 7,103,046 B2 * | 9/2006 | Tuck, III ................ H04L 47/24 370/392 | |
| 7,103,154 B1 * | 9/2006 | Cannon ................ H04M 1/6505 379/32.01 | |
| 7,130,970 B2 | 10/2006 | Devassy et al. | |
| 7,133,660 B2 * | 11/2006 | Irlam .................... G06Q 10/107 370/230 | |
| 7,162,496 B2 | 1/2007 | Amarendran et al. | |
| 7,167,924 B1 * | 1/2007 | Symonds ............... G06Q 20/10 705/43 | |
| 7,174,433 B2 | 2/2007 | Kottomtharayil et al. | |
| 7,236,769 B2 * | 6/2007 | Irlam .................... G06Q 10/107 370/352 | |
| 7,246,207 B2 | 7/2007 | Kottomtharayil et al. | |
| 7,257,833 B1 * | 8/2007 | Parekh ................ H04L 63/0227 726/1 | |
| 7,266,678 B2 * | 9/2007 | Wilks ................... G06F 9/4406 709/222 | |
| 7,272,378 B2 * | 9/2007 | Petry .................... G06Q 10/107 455/403 | |
| 7,277,695 B2 * | 10/2007 | Petry .................... G06Q 10/107 455/412.1 | |
| 7,315,923 B2 | 1/2008 | Retnamma et al. | |
| 7,319,858 B2 * | 1/2008 | Lewis ...................... H04L 29/06 340/7.29 | |
| 7,333,616 B1 * | 2/2008 | Brettle .................. H04L 9/0894 380/277 | |
| 7,343,453 B2 | 3/2008 | Prahlad et al. | |
| 7,376,661 B2 * | 5/2008 | Larson ................. G06F 9/45508 | |
| 7,401,148 B2 * | 7/2008 | Lewis ...................... H04L 29/06 709/204 | |

(56) References Cited

U.S. PATENT DOCUMENTS

| | | | | |
|---|---|---|---|---|
| 7,428,410 B2* | 9/2008 | Petry | G06Q 10/107 | 370/352 |
| 7,454,195 B2* | 11/2008 | Lewis | G06Q 20/102 | 370/312 |
| 7,487,262 B2* | 2/2009 | Cardina | H04L 12/589 | 709/246 |
| 7,496,628 B2* | 2/2009 | Arnold | G06Q 10/107 | 709/204 |
| 7,523,135 B2* | 4/2009 | Bradford | G06Q 10/06 | |
| 7,617,328 B2* | 11/2009 | Lewis | H04L 12/2856 | 709/206 |
| 7,653,394 B2* | 1/2010 | McMillin | H04L 45/00 | 370/331 |
| 7,689,709 B2* | 3/2010 | Surma | G06F 9/546 | 709/236 |
| 7,698,372 B2* | 4/2010 | Codignotto | G06Q 10/107 | 379/67.1 |
| 7,761,498 B2* | 7/2010 | Petry | G06Q 10/107 | 709/201 |
| 7,779,160 B1* | 8/2010 | Symonds | G06Q 20/10 | 705/21 |
| 7,796,760 B2* | 9/2010 | Brettle | H04L 9/0894 | 380/277 |
| 7,810,025 B2* | 10/2010 | Blair | G06F 17/227 | 715/239 |
| 7,831,240 B2* | 11/2010 | Patron | G06Q 20/102 | 379/114.2 |
| 7,836,081 B2* | 11/2010 | Cooper | G06F 9/542 | 706/1 |
| 7,840,537 B2* | 11/2010 | Gokhale | G06F 11/1453 | 707/652 |
| 7,886,359 B2* | 2/2011 | Jones | G06F 17/30675 | 707/758 |
| 7,913,053 B1* | 3/2011 | Newland | G06Q 10/107 | 173/165 |
| 8,015,318 B2* | 9/2011 | Kosaka | H04L 12/5835 | 709/206 |
| 8,028,030 B2* | 9/2011 | Edlund | G06Q 10/10 | 709/200 |
| 8,073,911 B2* | 12/2011 | Marston | H04L 29/06 | 709/206 |
| 8,229,954 B2 | 7/2012 | Kottomtharayll et al. | | |
| 8,285,681 B2 | 10/2012 | Prahlad et al. | | |
| 8,307,177 B2 | 11/2012 | Prahlad et al. | | |
| 8,364,652 B2 | 1/2013 | Vijayan et al. | | |
| 8,370,542 B2 | 2/2013 | Lu et al. | | |
| 8,578,120 B2 | 11/2013 | Attarde et al. | | |
| 8,607,325 B2* | 12/2013 | Kennedy | G06F 21/55 | 726/12 |
| 8,650,116 B2* | 2/2014 | Chehade | G06Q 10/087 | 705/26.2 |
| 8,655,941 B2* | 2/2014 | Roshen | G06F 9/546 | 370/392 |
| 8,660,537 B2* | 2/2014 | Lewis | H04L 29/06 | 455/412.1 |
| 8,660,853 B2* | 2/2014 | Robb | G06Q 30/04 | 705/1.1 |
| 8,667,594 B1* | 3/2014 | Banga | G06F 21/568 | 726/24 |
| 8,719,933 B1* | 5/2014 | Khajuria | G06F 21/608 | 726/22 |
| 8,843,117 B2* | 9/2014 | Sigmund | H04M 3/02 | 455/412.1 |
| 8,910,054 B2* | 12/2014 | Montagna | G06Q 10/10 | 715/751 |
| 8,934,611 B2* | 1/2015 | Doulton | G10L 15/265 | 379/88.01 |
| 9,043,926 B2* | 5/2015 | Hart | G06F 21/604 | 726/26 |
| 9,178,842 B2 | 11/2015 | Pamidiparthi | | |
| 9,384,735 B2* | 7/2016 | White | G06F 3/0236 | |
| 9,391,931 B2* | 7/2016 | Goldfinger | H04L 29/1216 | |
| 9,405,486 B2* | 8/2016 | Miller | G06F 3/0619 | |
| 9,405,763 B2* | 8/2016 | Prahlad | G06F 11/1453 | |
| 9,436,749 B2* | 9/2016 | Patron | G06Q 20/102 | |
| 9,454,537 B2* | 9/2016 | Prahlad | G06F 17/3002 | |
| 9,461,957 B2* | 10/2016 | Chang | H04L 51/32 | |
| 9,509,652 B2* | 11/2016 | Ahn | H04L 51/24 | |
| 2001/0039576 A1* | 11/2001 | Kanada | H04L 41/0893 | 709/223 |
| 2002/0053004 A1* | 5/2002 | Pong | G06F 12/0817 | 711/119 |
| 2002/0059382 A1* | 5/2002 | Yamaguchi | G06Q 10/107 | 709/206 |
| 2002/0069200 A1* | 6/2002 | Cooper | H04L 41/0609 | |
| 2002/0173283 A1* | 11/2002 | Morewitz, II | G10L 25/78 | 455/130 |
| 2003/0039258 A1* | 2/2003 | Tuck, III | H04L 47/24 | 370/401 |
| 2003/0079007 A1* | 4/2003 | Merkin | G06F 11/0745 | 709/223 |
| 2003/0088653 A1* | 5/2003 | Wilks | G06F 9/4406 | 709/223 |
| 2003/0095550 A1* | 5/2003 | Lewis | H04L 29/06 | 370/392 |
| 2003/0095555 A1* | 5/2003 | McNamara | H04L 29/06 | 370/401 |
| 2003/0096600 A1* | 5/2003 | Lewis | H04L 29/06 | 455/412.1 |
| 2003/0096605 A1* | 5/2003 | Schlieben | H04L 12/583 | 455/419 |
| 2003/0097597 A1* | 5/2003 | Lewis | H04L 63/083 | 726/7 |
| 2003/0101283 A1* | 5/2003 | Lewis | H04L 12/2856 | 709/246 |
| 2003/0109248 A1* | 6/2003 | Lewis | H04L 29/06 | 455/412.1 |
| 2003/0109271 A1* | 6/2003 | Lewis | H04L 29/06 | 455/517 |
| 2003/0110212 A1* | 6/2003 | Lewis | H04L 29/06 | 709/203 |
| 2003/0120502 A1* | 6/2003 | Robb | G06Q 30/04 | 705/34 |
| 2003/0126214 A1* | 7/2003 | Oliszewski | G06Q 10/107 | 709/206 |
| 2003/0153302 A1* | 8/2003 | Lewis | G06Q 20/102 | 455/412.1 |
| 2003/0187996 A1* | 10/2003 | Cardina | H04L 69/329 | 709/228 |
| 2004/0015132 A1* | 1/2004 | Brown | A61B 5/0002 | 604/131 |
| 2004/0017904 A1* | 1/2004 | Williams | H04M 15/00 | 379/114.15 |
| 2004/0058673 A1* | 3/2004 | Irlam | G06Q 10/107 | 455/412.1 |
| 2004/0107124 A1* | 6/2004 | Sharpe | G06Q 10/10 | 705/7.37 |
| 2004/0117428 A1* | 6/2004 | Surma | G06F 9/546 | 709/200 |
| 2004/0139053 A1* | 7/2004 | Haunschild | G06Q 10/10 | |
| 2004/0194107 A1* | 9/2004 | Masuoka | G06F 9/542 | 718/100 |
| 2004/0208178 A1* | 10/2004 | Tuck, III | H04L 47/24 | 370/392 |
| 2004/0230659 A1* | 11/2004 | Chase | H04L 12/581 | 709/206 |
| 2004/0254988 A1* | 12/2004 | Rodriguez | G06Q 10/107 | 709/206 |
| 2004/0260710 A1* | 12/2004 | Marston | G06Q 10/107 | |
| 2005/0064850 A1* | 3/2005 | Irlam | G06Q 10/107 | 455/414.1 |
| 2005/0066021 A1* | 3/2005 | Megley | G06Q 10/06 | 709/223 |
| 2005/0108316 A1* | 5/2005 | Cantu | G06Q 10/107 | 709/200 |
| 2005/0141688 A1* | 6/2005 | Wengrovitz | H04L 12/581 | 379/207.02 |

(56) References Cited

U.S. PATENT DOCUMENTS

| | | | |
|---|---|---|---|
| 2005/0266832 A1* | 12/2005 | Irlam | G06Q 10/107 455/412.2 |
| 2005/0288994 A1* | 12/2005 | Haunschild | G06Q 10/06395 705/7.41 |
| 2006/0010322 A1* | 1/2006 | Novack | H04L 51/34 713/170 |
| 2006/0026242 A1* | 2/2006 | Kuhlmann | H04L 51/12 709/206 |
| 2006/0031351 A1* | 2/2006 | Marston | H04L 29/06 709/206 |
| 2006/0041503 A1* | 2/2006 | Blair | G06F 17/227 705/37 |
| 2006/0041518 A1* | 2/2006 | Blair | G06F 17/227 705/80 |
| 2006/0041840 A1* | 2/2006 | Blair | G06F 17/227 715/249 |
| 2006/0085403 A1* | 4/2006 | Harrison | G06Q 30/02 |
| 2006/0085543 A1* | 4/2006 | Hrastar | H04L 63/1408 709/224 |
| 2006/0123048 A1* | 6/2006 | Larson | G06F 9/45508 |
| 2006/0143307 A1* | 6/2006 | Codignotto | G06Q 10/107 709/246 |
| 2006/0155808 A1* | 7/2006 | Irlam | G06Q 10/107 709/203 |
| 2006/0178136 A1* | 8/2006 | Irlam | G06Q 10/107 455/414.1 |
| 2006/0179476 A1* | 8/2006 | Challener | H04L 63/20 726/4 |
| 2006/0187478 A1* | 8/2006 | Kongtcheu | G06F 3/1206 358/1.13 |
| 2006/0224846 A1 | 10/2006 | Amarendran et al. | |
| 2007/0067363 A1* | 3/2007 | Cooper | G06Q 50/22 |
| 2007/0083922 A1* | 4/2007 | Reiner | H04L 12/5855 726/12 |
| 2007/0112574 A1* | 5/2007 | Greene | G06F 9/5072 340/572.1 |
| 2007/0168301 A1* | 7/2007 | Eisner | G06F 9/546 705/79 |
| 2007/0198437 A1* | 8/2007 | Eisner | G06F 9/546 705/79 |
| 2008/0005221 A1* | 1/2008 | Irlam | G06Q 10/107 709/201 |
| 2008/0083009 A1* | 4/2008 | Kaler | H04L 63/20 726/1 |
| 2008/0183603 A1* | 7/2008 | Kothari | G06Q 10/06 705/30 |
| 2008/0212782 A1* | 9/2008 | Brettle | H04L 9/0894 380/277 |
| 2008/0244092 A1* | 10/2008 | Kosaka | H04L 12/5835 709/246 |
| 2008/0288575 A1* | 11/2008 | Larson | G06F 9/45508 709/201 |
| 2009/0012834 A1* | 1/2009 | Fahey | G06Q 10/06311 705/7.15 |
| 2009/0097662 A1* | 4/2009 | Olechowski | G06F 21/554 380/286 |
| 2009/0164233 A1* | 6/2009 | Arnold | G06Q 10/107 705/342 |
| 2009/0210496 A1* | 8/2009 | Shaffer | G06Q 10/10 709/206 |
| 2009/0262726 A1* | 10/2009 | Lord | H04L 65/1093 370/352 |
| 2009/0281829 A1* | 11/2009 | Hansen | G06Q 10/107 705/2 |
| 2009/0292779 A1* | 11/2009 | Edlund | G06Q 10/10 709/206 |
| 2009/0319534 A1 | 12/2009 | Gokhale | |
| 2010/0088166 A1* | 4/2010 | Tollinger | G06Q 20/20 705/14.13 |
| 2010/0180047 A1* | 7/2010 | Surma | G06F 9/546 709/236 |
| 2011/0007902 A1* | 1/2011 | Brettle | H04L 9/0894 380/278 |
| 2011/0072486 A1* | 3/2011 | Hadar | G06F 21/6218 726/1 |
| 2012/0150818 A1 | 6/2012 | Vijayan Retnamma et al. | |
| 2012/0150826 A1 | 6/2012 | Vijayan Retnamma et al. | |
| 2013/0290280 A1* | 10/2013 | Prahlad | G06F 11/1453 707/692 |
| 2014/0025762 A1* | 1/2014 | Singh | G06Q 20/40 709/206 |
| 2014/0089191 A1* | 3/2014 | Brown | G06Q 20/12 705/44 |
| 2014/0108507 A1* | 4/2014 | Barker | H01R 13/74 709/203 |
| 2014/0181983 A1* | 6/2014 | Hart | G06F 21/604 726/26 |
| 2016/0217786 A1* | 7/2016 | Jablokov | G06Q 30/0251 |

FOREIGN PATENT DOCUMENTS

| | | | |
|---|---|---|---|
| EP | 0467546 | 1/1992 | |
| EP | 0541281 | 5/1993 | |
| EP | 0774715 | 5/1997 | |
| EP | 0809184 | 11/1997 | |
| EP | 0899662 | 3/1999 | |
| WO | WO 1995/013580 | 5/1995 | |
| WO | WO 1999/012098 | 3/1999 | |
| WO | WO 2006/052872 | 5/2006 | |
| WO | WO 2006088915 A1 * | 8/2006 | ............ G06Q 10/107 |
| WO | WO 2013/158764 | 10/2013 | |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, New York, US, pp. 1-15 (May 1991).

* cited by examiner

SYSTEM AND METHOD FOR MONITORING AND COPYING MULTIMEDIA MESSAGES TO STORAGE LOCATIONS IN COMPLIANCE WITH A POLICY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

The inventions described herein relate to electronic communication systems. More particularly, the inventions described herein relate to systems and methods for monitoring messages in electronic communication systems that allows network operators to define and identify messages of interest, classify and organize those messages to efficiently store them to facilitate subsequent retrieval, auditing or compliance inquiries.

Currently, corporate environments provide numerous forms of electronic communication. For example, corporate employees may communicate internally or with others outside the company through telephones, videophones, voicemail, email, text messages, instant messages, or through electronic collaboration applications such as chat rooms or online blogs. In many cases, these messaging solutions may further include imbedded content such as audio, video or text based attachments that convey or otherwise communicate the desired information, with the messaging application merely acting as a delivery agent.

Such messaging applications can be divided into two general groups, synchronous and asynchronous. Synchronous messaging typically involves a substantially instant dialogue between the communicating parties. Asynchronous messaging, on the other hand, involves monologue-based messages between the communicating parties, which are stored in a known location and may be later accessed by the receiving party to review and respond.

Synchronous messaging is still primarily carried out using PBX (Private Branch Exchange) or PSTN (public switched telephone network) networks. With the advent of commercially viable data oriented messaging solutions, more and more synchronous communications are occurring over the Internet in different forms. Some of the most popular type of synchronous messaging include IM (instant messaging), and VoIP (Voice over Internet Protocol) involving streaming audio/video technologies.

Asynchronous messaging is mostly carried out using commercial messaging systems, which involve electronic mailing (e.g., email or SMTP server). These types of messaging systems usually have central storage locations, such as an email or other messaging server, which is frequently administered by the business entity using them.

Synchronous messaging platforms using analog communication technologies remain fairly common. Although data oriented communication, such instant messaging and VoIP, is becoming increasingly popular, it has not fully superseded traditional methods of device based communication (e.g., PSTN telephone communication). As a result, a new blend of communication solutions are being generated, where data oriented communication mechanisms complement the traditional legacy networks. These approaches create numerous possible messaging configurations in which data oriented networks control traditional, and enable messaging between the two. Solutions are being created that integrate these networks and add more sophisticated features into the combination so as to increasingly transform conventional device interaction to individual interaction.

One class of such solutions includes instant messaging applications that promote optimum network use which increases performance of the IM application. Peer to peer (P2P) protocols have been used in this scenario, which provide direct host to host connections between the participants using optimized network paths. Many consumer applications in this sector use proprietary P2P protocols. Such applications tend to be centered on the individual. Administration of these applications may be difficult for network operators, especially in connection with certain management functions such as resource allocation or regulatory compliance. In addition, these applications do not fit neatly within the existing information structures of the corporate networks, thus making collaboration application limited.

A second class of applications prefers centralized synchronous messaging applications. In these applications, the organization may exert control over the communications environment from a compliance or management perspective, which may be easily integrated with its own corporate networks as well as partner networks. This may allow users to gain access to corporate enabled features such as security, compliance and effective policy applications for the administrators, while at the same time allowing use of corporate identity management features to locate people connected to the network. Client/server applications are used in these systems, and a set of protocols are being developed based on the standards.

Although the emergence of these various forms of electronic communication, and their integration into one another have generally improved productivity, no central management system exists to monitor, coordinate or otherwise administer or oversee such communications. As a result, IT managers tend to administer each of these communication technologies separately, which causes significant inefficiencies when attempting to implement corporate data management or communication polices.

For example, regulatory requirements increasingly require businesses to comply with data retention and administration standards that help complete an audit (usually by external audit agencies) of the activities undertaken by individuals involved in the business. One important activity performed in the course of conducting the business is the various forms of electronic messaging. Accordingly, auditors are frequently interested in examining the entire body of electronic messages relating to certain aspects of the business irrespective of the particular communication platform(s) used. Thus, it would be desirable to have the capability to define and identify electronic messages of interest within a business enterprise and store them such that they can easily be retrieved and examined in connection with an audit or other inquiry.

Furthermore, company management may wish to restrict, limit or otherwise be aware of communications relating to certain subject matter or among certain parties in order to ensure compliance with established communication policies or other administrative or legal restrictions. Thus, it would be further desirable to have the capability to define and identify electronic messages of interest before, during, or after a communication session so that any appropriate action may be taken (restrict communication, tag and store message as relevant to one or more topics or areas of inquiry, etc.).

SUMMARY

The present inventions relate systems and methods for monitoring and managing electronic messages in one or more computer networks. More particularly, the systems and methods of the present invention provide a substantially global or unified approach to messaging management within one or more computer networks that allows network administrators or other authorized users to define and identify electronic messages of interest within the network and store selected messages such that they can be retrieved and examined in connection with an audit or other inquiry.

In addition, aspects of the present invention provide systems and methods that may restrict, limit or otherwise identify communications relating to certain subject matter or among certain parties in a computer network to promote or ensure compliance with established communication policies or other administrative or legal restrictions associated with electronic communication. One way this may be accomplished is by defining and identifying electronic messages of interest before, during, or after a communication session so that any appropriate action may be taken (restrict communication, tag and store message as relevant to one or more topics or areas of inquiry, etc.).

One embodiment of the invention may include a computer-usable medium having stored therein computer-usable instructions for a processor, wherein said instructions when executed by the processor cause the processor to: initiate and administer a messaging session between two to or more clients a with communication server; create a compliance policy for defining messages of interest; and configure a compliance agent to monitor the messaging session, identify messages of interest within the messaging session and direct storage of identified messages, wherein the compliance agent determines a file format of the identified messages and optionally converts identified messages to a file format specified in the compliance policy.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE PREFERRED EMBODIMENT

Figure 1:
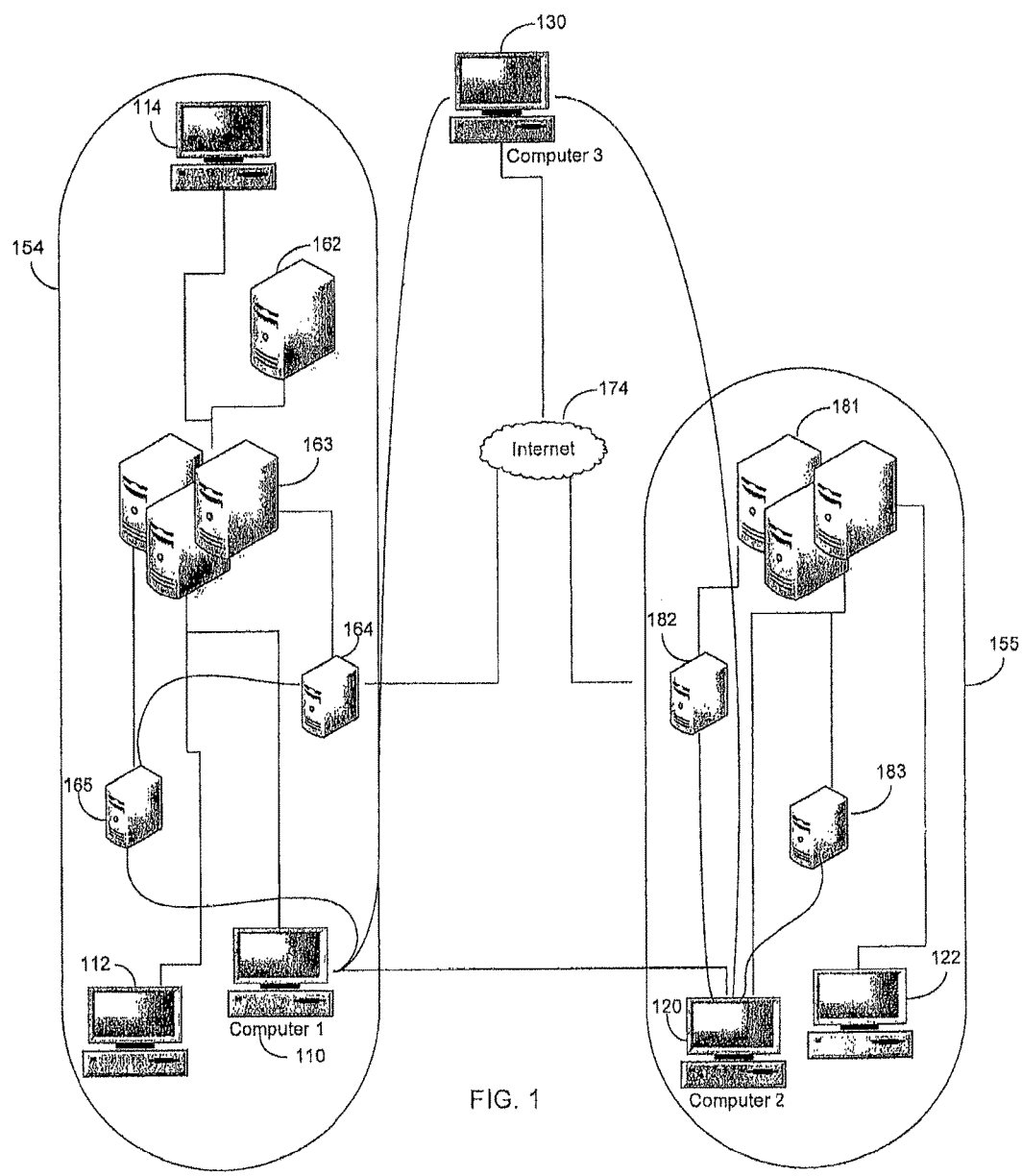
FIG. 1 illustrates a schematic block diagram of an electronic communication system constructed in accordance with the principles of the present invention.

The present inventions relate systems and methods for monitoring and managing electronic messages in one or more computer networks. More particularly, the systems and methods of the present invention provide a substantially global or unified approach to messaging management within one or more computer networks that allows network administrators or other authorized users to define and identify electronic messages of interest within the network and store selected messages such that they can be retrieved and examined in connection with an audit or other inquiry.

In addition, aspects of the present invention provide systems and methods that may restrict, limit or otherwise identify communications relating to certain subject matter or among certain parties in a computer network to promote or ensure compliance with established communication policies or other administrative or legal restrictions associated with electronic communication. One way this may be accomplished is by defining and identifying electronic messages of interest before, during, or after a communication session so that any appropriate action may be taken (restrict communication, tag and store message as relevant to one or more topics or areas of inquiry, etc.).

Although the present inventions are illustrated herein in connection with a computer network associated with a business or corporate enterprise, it will be understood that they are equally applicable to any suitable LAN or WAN type network that has one or more electronic messaging systems and may include other entities such small businesses and/or individual users. Moreover, it will be further understood that such computer networks may be portions of larger networks within a given enterprise and that aspects of the present invention may be selectively deployed to any suitable portion of such networks defined or specified by a network administrator, including certain business units, specific users or other organizational groups.

For example, it may be desired to identify and monitor electronic messages associated with certain groups such as accounting, legal, compliance, management, IT, technical groups, or administrator defines groups, etc. Other selective applications may include specific people with such groups and may further specify other criteria such as subject matter, time of day, messaging application, etc. Such groups need not be pre-existing (e.g., such as email groups) and may be defined as further described herein.

Furthermore, the solutions described herein are applicable to a wide variety of electronic communication systems which include both the synchronous and asynchronous communication technologies mentioned above. In some embodiments, the present invention may be constructed as one or more data structures or software modules, such as a monitoring or compliance agent, which are deployed to various computing or communication platforms with a given network for monitoring, identifying and subsequently directing storage and/or retrieval of certain electronic messages.

One embodiment of the invention is concerned with the administration of messaging systems which use the Session Initiation Protocol (SIP) to initiate and control messaging between a given source and destination. This may include communication networks that support or provide two-party or multiparty multimedia communication sessions such as voice and video calls over the Internet or other communications network. It may also include systems which provide video conferencing, streaming multimedia distribution, instant messaging, presence information and gaming applications. Moreover, such messaging systems may also support some or all of the advanced communication features present in SS7 (Signaling System 7) networks and interact with other data transfer protocols such as the Session Description Protocol (SDP) and Real-time Transfer Protocol (RTP).

In such embodiments, aspects of the invention may reside in (or interoperate with) certain SIP control agents such as SIP User Agents (SIP UAs) including User Agent Client (UAC) or User Agent Server (UAS) modules which may be modified and/or monitored to determine the initiation of a communications session and to identify messages of interest. With this approach, software modules, such as monitoring or compliance agents may be selectively deployed to one or more clients and/or servers to monitor and identify messages of interest.

Furthermore, embodiments of the invention may also interact with other legacy communication platforms such as standard PBX and PSTN networks. This may be accomplished using any suitable software or other intermediate control and/or interface logic that preferably seamlessly interoperates with such legacy networks to provide both legacy and/or more sophisticated voice and data communication service. One example of such software is Office Communication Server (OCS) from Microsoft Corporation. However, any other similar software or logic may be used, if desired.

FIG. 1 illustrates a schematic block diagram of a computer network, constructed in accordance with the principles of the present invention. As shown, system 100 includes a plurality of clients, which may clients 110, 112, 114, 120, 122 and 130. These clients may be any suitable client device such a personal computer, network terminal, or mobile client device including a cell phone, smart phone, PDA and like. In operation, communication servers 164 and 182 manage the instantiation, data transfer and termination of one or more messaging sessions between the clients.

The embodiment illustrated in FIG. 1 may represent a portion of a computer network 100 commonly found in a corporate or business environment. Client computers 110, 120 and 130 may be disparate geographic locations as the computer network may cover several different office locations. For example, network 154 may represent a LAN in the New York office of a business while network 155 represents a LAN in the San Francisco office. Computer 130 may represent a remote computer such an employee telecommuting from home or while on a business trip. As shown, network 100 may provide one or more synchronous messaging applications, with communication server 164 and 182 being SIP-enabled.

In the illustrated embodiment, communication servers 164 and 182 may include Microsoft Office Communications Server (OCS) or other suitable software or logic for interacting with the various different communication technologies. LAN 154 may further include domain management devices 163 and compliance agents 162 and 165 (described in more detail below). Similarly, LAN 155 may further include domain management devices 181 and compliance agent 183. Other embodiments of the present invention may use a communication server with similar functionality other than an OCS.

In some embodiments, the client computers may include certain client applications for initiating, managing, and terminating communication sessions through servers 164 and 182. Such applications may include Office Communicator, also developed by Microsoft Corporation (however any similar suitable application or logic may be used, if desired). This type of client/server application combination (e.g., OCS and Office Communicator) preferably allows conventional and data oriented networks interoperate with each other, with network transitions being substantially seamless through automated policies built into the applications that route the calls or other communications automatically based on user preferences.

Other similar protocols which may be used in conjunction with the present invention include, but are not limited to: 'Jabber & XMPP'; .H323; MGCP; and RTP (for voice and video communication) and Jingle which is an extension to XMPP. Although these applications use a central server to access presence information and routing information, real time communication (media transport or audio/video) occurs peer to peer, in part because of the complexities that arise from bandwidth usage and bottleneck avoidance in the networks. Moreover, certain applications are used where only the text portion of a message can be captured in the central server. Examples include, but are not limited to, Microsoft Office Communications Server, and FaceTime®.

As mentioned above, communication servers 164 and 182 may manage the instantiation, administration and termination of messaging session(s) between two or more participants. Both the participants may be within the same domain or different domains in the same organization. In FIG. 1, each LAN 154 and 155 represent different domains within the same organization.

In operation, any of clients, including computers 110, 120 or 130 may initiate a communication or messaging session. For example, client 130 may initiate an instant messaging session with client computers 110 and 120. In this case, the IM request may pass through Internet 174 and to client 110 through communications server 164 and similarly to client 120 through communications server 182. Such a communications session may also further include audio (e.g., through VoIP) and/or a video component. Network routing and management of the communications session may be managed through the client and server applications described above.

Network administrators may desire to track such communications in order to comply with established communications policies or regulatory requirements. One way this may be accomplished is by monitoring communications including message contents to determine whether they fall into categories that may be relevant to applicable policies, relate to certain subject areas or are relevant to other types of inquiries, such as regulatory or financial inquiries.

Such relevant subject matter may be defined by network administrators or other authorized network users. For example, a network administrator in consultation with management and legal advisors may define types of messages or message content and/or communications that are of interest or need to be stored, restricted or prevented. Such subject matter may also be in the form of pre-existing data management policies or preferences. This information may entered or uploaded a through an editing or compliance program interface specifically designed for this task (not shown) and may include pull down menus and other pre-defined default setting based on the type of business involved. For example, regulatory or auditing requirements vary from business to business. A brokerage house has different compliance and retention needs than a hospital, which as different needs from a drug manufacturer or law firm. Default categories may be automatically selected based on the type of business identified. These defaults may be further supplemented based on an analysis of network configuration or communication technologies used (typically during installation).

Examples of how such content may be defined includes, but is not limited to, user-specified keywords or subject matter definitions (e.g., financial, legal, technical, marketing, budget, investor relations, corporate compliance, etc.) content type, attachment type, etc. Other criteria that may be considered includes: author, point of origination, destination (chat room, bulletin board, etc.) recipient(s), time of day, communication application used, etc. Such groups need not be pre-existing (e.g., such as email groups) and may be defined as further described herein.

Thus, initially, a network administrator may define content and other message attributes of interest for storage and retrieval during a subsequent compliance inquiry. One way this may be accomplished by creating one or more "compliance policies" that set forth subject matter of interest and define what steps are to be taken with messages that satisfy the defined criteria (i.e., specify storage paths and locations, data format and/or conversion preferences, specify data retention criteria, whether such information is confidential and access is limited to a certain authorized individuals, etc.). Such compliance policies may be any suitable data structure, software module, computer code or other application suitable for performing the tasks further described herein.

Afterwards, these preferences may be communicated to (or converted into) filters or recognition and processing routines that are deployed as part of customized compliance or monitoring agents within network 100. Such compliance or monitoring agents are shown in FIG. 1 as agents 162, 165 and 183.

Although these agents are depicted as residing on independent hardware platforms, it will be understood that such agents may physically reside on, or be distributed to, any suitable computing device(s) in network 100 such as client computers, communications servers or domain devices. Moreover, it will be further understood that such monitoring agents may be embodied as software, firmware or any other logic capable of performing the functions described herein. For example, in some embodiments, the agents may be deployed as part of (or in place of) UAC or UAS agents. Moreover, such agents may also be embodied as one or more client or sever-side "bots" which to act to index and transmit content from one point to another. In some embodiments, such bots may include one or more media bots and/or remote file management bots.

Thus, after monitoring criteria are established, compliance agents may be distributed (or updated) throughout network 100. Initially, this may be done as part of an application installation routine, with updates being distributed periodically (e.g., as regulatory requirements or message definitions are changes or updated). During the installation routine, specific hardware information may be collected through auto-discovery or other known network analysis techniques and compliance agents may be installed in the appropriate network locations based on the results of that analysis.

During ensuing communication sessions, the content of various messages traveling within network 100 may be monitored based on the established criteria. Messages such as text-based messages and attachments that meet the defined criteria are identified and then stored in certain memory locations or database within the network. This storage medium may be selected such that it may be easily or quickly accessed or dedicated to a compliance or auditing function to ensure data integrity. Such a memory or archiving device may be located in, or associated with, domain devices 163 or 181. As mentioned above, the storage path and storage device for a given message may be specified by the applicable compliance policy.

In the case where messages include audio or video components, such information may be converted to text format and stored along with the native media file for future use. For example, a text message may include a video having an associated audio component attachment. If the text message is identified as relevant by a compliance agent, the attachment may be converted to text by passing it through speech recognition software. The converted text file may be added to the text message along with the raw video file and placed saved in memory for future examination.

Moreover, in some embodiments where messages have limited or no text content but include multimedia attachments, those attachments may be buffered or copied to an intermediate memory location and examined as described above to determine whether they include relevant information. Messages that do not meet the selection criteria are removed or deleted. Messages that are selected as relevant re then forwarded to the appropriate compliance database or storage medium.

In some embodiments, network 100 may perform certain memory management functions on stored messages to improve search and retrieval functions and to reduce or eliminate duplicative information. For example, network 100 may employ certain data de-duplication measures such as single instance storage technologies to remove duplicative information. For example, in the case where client computer 110 is in communication with client computer 120, some or all of the same messages may be tagged and stored by both compliance agent 165 and compliance agent 183. Such duplicative information may be identified by one or more computers in domain device$ and 163 and 181 and removed such that one copy of this message remains rather than multiple copies in each domain.

Moreover, in some embodiments, compliance agents and/or domain devices may perform certain data conversion routines on identified messages to reduce the number of different file format types stored within network 100. For example, some or all audio messages may be converted to a common popular compressed file format such as MP3 to conserve memory and ensure ease of playback and future compatibility. For example, WAV, PCM, AA3 or other audio file types may be identified and then converted to MP3 files prior to (or sometime after initial) storage. Video files may be treated similarly. Moreover, word processing or spreadsheet file types may be identified and converted to a common file type or may be converted to text files. For example, WordPerfect files may be converted to MS Word files or to ASCII or text files, etc.

Additional features provided by the present invention may include real-time monitoring of messages to prevent or prohibit certain types of communication. For example, a company may wish to prevent its employees from visiting chat rooms or posting to message boards while at work. In this case, the network administrator may define these types of transactions as prohibited through a compliance policy or communication restriction. Thus, if an employee attempts to send a text message, email or other communication to these destinations, a copy of that message may be stored and management alerted to this transaction. Furthermore, a warning or reminder screen may appear prior to (or after) the message is sent informing the user that the contemplated action is in violation of established communication policies. In some embodiments, the action may be blocked.

A similar procedure may be used to prohibit communications within an enterprise or to make management aware of such communications. For example, a group of investment advisors in one location may be prohibited from communicating with a group of investment advisors at another location. Thus, if an employee of the first group attempts to send a text message, email or other communication to the second group, a copy of that message may be stored and management alerted to this transaction. Furthermore, a warning or reminder screen may appear prior to (or after) the message is sent informing the user that the contemplated action is in violation of established communication policies. In some embodiments, the action may be blocked and further such communications prevented.

Figure 2:
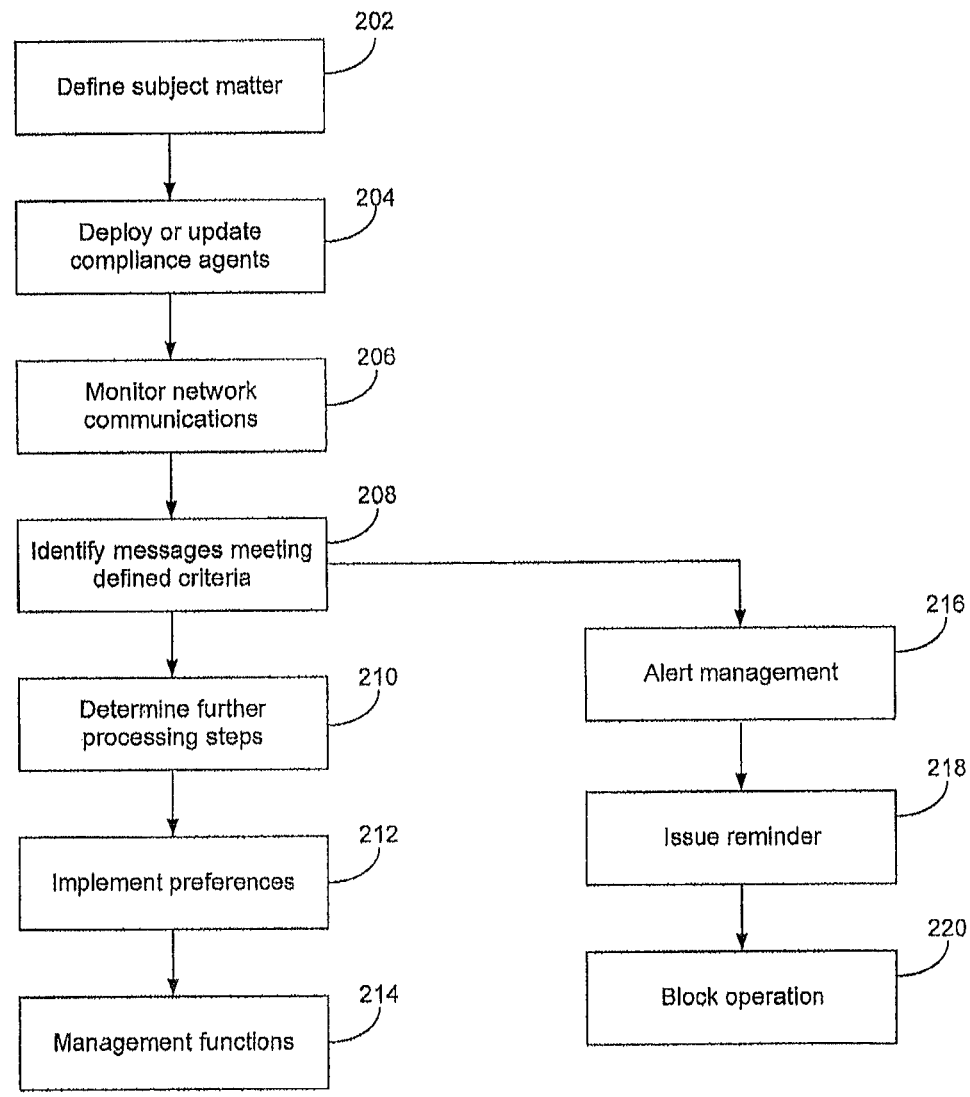
FIG. 2 is a flow chart illustrating some of the steps involved in monitoring and selectively storing certain electronic messages in accordance with an embodiment of the present invention.

FIG. 2 is a flow chart 200 illustrating some of the steps associated with the monitoring and storing of electronic messages in accordance with an embodiment of the present invention. Initially, at step 202, a network administrator or other authorized user may define subject matter or communication attributes that will trigger a storage response from compliance agents within network 100. As mentioned above, this may include user specified keywords, subject matter, content type, attachment type, etc. Other criteria that may be considered includes author, point of origination, destination recipient(s), time of day, communication application used, etc. Such groups need not be pre-existing and may be defined as further described herein.

This may be accomplished by creating one or more compliance policies that set forth subject matter of interest and define what steps are to be taken with messages that satisfy the defined criteria. Subsequently, the preferences specified in these policies may be communicated to (or converted into) filters or recognition and processing routines that are deployed as part of customized compliance or monitoring agents within network 100 (step 204).

Next, at step 206, the compliance agents may monitor communication within a specified network for messages that meet the defined criteria. This may be accomplished using any suitable active or passive data monitoring technique known in the art such as IGMP or DCHP snooping of data packets or by directly comparing characters in payload sections of messages to the defined keywords or topics of interest. In some embodiments, the compliance agent may add itself to the communication link such that substantially all data passes through it so that the data can be monitored in real time. In other embodiments, message data may be copied for analysis, and the compliance agent may operate in parallel with the communication link.

Next, at step 208, the compliance agents identify messages that meet the criteria specified in the compliance policies. At this point, the compliance agents may refer to the applicable compliance policy to determine what further steps need to be performed on the identified messages (step 210). For example, in some embodiments, the compliance policy may specify the storage path, database or memory location to store that message. Because the various compliance definitions may be applicable to different regulations or auditing inquiries, different messages may have different storage locations, retention criteria, confidentiality designations etc. Moreover, the compliance policy may specify certain format or conversion preferences for the identified message.

Next, at step 212, once the data processing preferences have been obtained, those preferences are implemented. For example, this may include converting the format of the message to a format defined in the compliance policy. Further, this may include converting audio and/or video message to text files, which may be indexed and searched for auditing or regulatory compliance purposes. Converted messages may then be stored a in designated memory location and indexed for future retrieval. The storage manager of this procedure may create a message log which identifies each message by certain descriptors such as size, file type, date received, reason message was selected, confidentiality designation, etc.

Next, at step 214, certain memory management functions may be performed on stored messages to improve search and retrieval operations and to reduce or eliminate duplicative information. For example, certain data de-duplication measures such as single instance storage technologies may be employed to remove duplicative information. For example, in the case where one or more client computers in different domains exchange messages, some or all of the same messages may be tagged and stored by compliance agents in both domains. Such duplicative information may be periodically identified and removed such that one copy of this message remains rather than multiple copies in each domain.

Additional features provided by the present invention may include real-time monitoring of messages to prevent or prohibit certain types of communication. For example, a company may wish to prevent its employees from visiting chat rooms or posting to message boards while at work. In this case, the network administrator may define these types of transactions as prohibited through a compliance policy or communication restriction (step 202). Thus, if an employee attempts to send a text message, email or other communication to these destinations, a copy of that message may be stored and management alerted to this transaction (step 216) Furthermore, a warning or reminder screen may appear prior to (or after) the message is sent informing the user that the contemplated action is in violation of established communication policies (step 218). In some embodiments, the action may be blocked (step 220).

Systems and methods described herein may comprise software, firmware, hardware, or any combination(s) of software, firmware, or hardware suitable for the purposes described herein. Software and other modules may reside on servers, workstations, personal computers, computerized tablets, personal digital assistants (PDAs), and other devices suitable for the purposes described herein. Software and other modules may be accessible via local memory, via a network, via a browser or other application in an application service provider (ASP) context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate Aspects of the present inventions described herein may be embodied as computer-executable instructions, such as routines executed by a general-purpose computer, e.g., a server computer, wireless device or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computer system comprising:
   a plurality of first computing devices comprising computer hardware and one or more first storage devices, wherein the plurality of first computing devices electronically send a plurality of messages to a plurality of destinations during one or more instant messaging sessions using peer-to-peer networks, wherein at least a portion of the plurality of messages comprise multimedia messages in different file formats;
   a graphical user interface (GUI) configured to provide input functionality allowing a user to specify a compliance policy comprising criteria for identifying multimedia messages of interest among the plurality of messages communicated between the first computing devices during one or more instant messaging sessions, wherein the compliance policy further identifies designated storage for storing copies of the messages of interest, and wherein the designated storage is different than storage associated with the plurality of destinations, wherein the compliance policy further defines a compliance file format that is different than the plurality of multimedia file formats; and
   converting the compliance policy into recognition routines that are deployed in a plurality of compliance monitoring agents within the network, wherein the plurality of compliance monitoring agents within the network monitor the plurality of messages, the compliance monitoring agents comprising at least a second computing device comprising computer hardware that is in communication with the first computing devices, the plurality of compliance monitoring agents configured to:
   monitor the plurality of messages within the instant messaging sessions using the peer-to-peer networks, with a session initiation protocol (SIP) comprising IGMP or DCHP snooping of data packets;
   identify the multimedia messages in the plurality of messages monitored within the instant messaging sessions;
   for at least a first multimedia message, where the first multimedia message comprises at least an audio data portion, automatically convert the audio data portion to converted text with speech recognition software;
   compare the converted text to selection criteria to identify the copy of the first multimedia message as one of one or more identified messages of interest within the instant messaging sessions;
   block the first multimedia message that meets the selection criteria from being sent to an intended destination; and
   direct storage of the copy of the first multimedia message that meets the selection criteria by automatically directing conversion of the copy of the first multimedia message into the compliance file format to reduce the number of different file formats stored in the designated storage, and store the converted copies of the first multimedia message in the designated storage specified in the compliance policy.

2. The computer system of claim 1, further comprising a Session Initiation Protocol (SIP) server configured to initiate and administer the instant messaging sessions.

3. The computer system of claim 1 wherein the copy of the first multimedia message is identified as one of the one or more identified messages of interest prior to storage of the copy of the first multimedia message in the designated storage specified in the compliance policy.

4. The computer system of claim 1, wherein the system further comprises a speech recognition module configured to convert the audio data portion into the converted text.

5. The computer system of claim 1, wherein the compliance policy specifies a confidentiality designation for the one or more identified messages of interest.

6. The computer system of claim 1, wherein the one or more identified messages of interest are conveyed by a public switched telephone network (PSTN) or a private branch exchange (PBX) network and controlled by a data network.

7. The computer system of claim 1, wherein the compliance monitoring agent is further configured to determine that text associated with the copy of the first multimedia message is not in the compliance file format type specified in the compliance policy, and to convert the text associated with the first multimedia message into the compliance file format type.

8. The computer system of claim 7, wherein the a type of the compliance file format comprises an American Standard Code for Information Interchange (ASCII).

9. The computer system of claim 8, wherein the compliance monitoring agent is configured to convert the text associated with the copy of the first multimedia message from one or more of:
   MS Word to WordPerfect;
   WordPerfect to MS Word;
   MS Word to ASCII; and
   WordPerfect to text.

10. The computer system of claim 1, wherein the compliance monitoring agent further comprises a Session Initiation Protocol User Agent or a Session Initiation Protocol User Agent Client.

11. The computer system of claim 1, further comprising a de-duplicating agent configured to de-duplicate the copy of the first multimedia message stored in the designated storage.

12. The computer system of claim 1, wherein the compliance policy incorporates legal or regulatory requirements.

13. A method of processing electronic messages in a computer system, comprising:

providing a graphical user interface (GUI) configured to allow a user to specify a compliance policy comprising criteria for identifying multimedia messages of interest among a plurality of messages communicated between a plurality of first computing devices during one or more instant messaging sessions wherein the multimedia messages comprise different file formats, wherein the plurality of first computing devices electronically send the plurality of messages to a plurality of destinations during one or more instant messaging sessions using peer-to-peer networks, and wherein the compliance policy further identifies designated storage for storing copies of the messages of interest, wherein the designated storage is different than storage associated with the plurality of destinations, wherein the compliance policy further defines a compliance file format that is different than the plurality of multimedia file formats;

with at least one computing device comprising computer hardware and one or more first storage devices converting the compliance policy into recognition routines that are deployed in a plurality of compliance monitoring agents within the network;

monitoring with the plurality of compliance monitoring agents, the plurality of messages within the instant messaging sessions using the peer-to-peer networks, with a session initiation protocol (SIP) comprising IGMP or DCHP snooping data packets;

identifying the multimedia messages in the plurality at messages monitored within the instant messaging sessions;

for at least a first multimedia message, where the first multimedia message comprises at least an audio data portion, converting the audio data portion to converted text with speech recognition software;

based at least in part on comparing the converted text to selection criteria, identifying the copy of the first multimedia message as one of one or more identified messages of interest within the instant messaging sessions;

blocking the first multimedia message that meets the selection criteria from being sent to an intended designation; and storing the copy of the first multimedia message that meets the selection criteria by directing conversion of the first multimedia message into the compliance file format to reduce the number of different file formats stored in the designated storage, and store the converted copy of the first multimedia message in the designated storage specified in the compliance policy.

14. The method of claim 13, further comprising conveying the one or more identified messages of interest over a public switched telephone network (PSTN) or a private branch exchange (PBX) network and controlling the one or more identified messages, at least in part, with a data network.

15. The method of claim 13, further comprising determining that text associated with the copy of the first multimedia message is not in the compliance file format, and converting the text associated with the first multimedia message into the compliance file format.

16. The method of claim 15, wherein a type of the file format type comprises one or more of the group consisting of MS Word, WordPerfect, and American Standard Code for Information Interchange (ASCII).

17. The method of claim 13, further comprising de-duplicating the copy of the first multimedia message.

* * * * *